(12) United States Patent
Dherde et al.

(10) Patent No.: US 10,598,424 B2
(45) Date of Patent: Mar. 24, 2020

(54) HINGE SUPPORT ASSEMBLY

(71) Applicant: WHIRLPOOL CORPORATION, Benton Harbor, MI (US)

(72) Inventors: Eric J. Dherde, St. Joseph, MI (US); Michael A. Fiori, Evansville, IN (US); Lynne F. Hunter, Dorr, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 50 days.

(21) Appl. No.: 15/577,010

(22) PCT Filed: Dec. 2, 2016

(86) PCT No.: PCT/US2016/064594
§ 371 (c)(1),
(2) Date: Nov. 27, 2017

(87) PCT Pub. No.: WO2018/101954
PCT Pub. Date: Jun. 7, 2018

(65) Prior Publication Data
US 2019/0011174 A1    Jan. 10, 2019

(51) Int. Cl.
*F25D 23/02* (2006.01)
*E05D 15/26* (2006.01)
(Continued)

(52) U.S. Cl.
CPC ......... *F25D 23/028* (2013.01); *E05D 15/266* (2013.01); *F25D 23/062* (2013.01);
(Continued)

(58) Field of Classification Search
CPC ................ E05D 15/266; F25D 23/062; F25D 2323/021; F25D 2323/024; F25D 2201/14; F25D 23/028; E05Y 2900/31
(Continued)

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

*Primary Examiner* — Hiwot E Tefera
*Assistant Examiner* — Ryan A Doyle
(74) *Attorney, Agent, or Firm* — Price Heneveld LLP

(57) ABSTRACT

An appliance is provided herein. The appliance includes a cabinet having a wrapper, a liner, and a trim breaker. The wrapper, the liner, and the trim breaker define an insulating cavity therebetween. An insulating material is disposed within the insulating cavity. A frame includes an upper frame portion, a vertical frame portion, and a lower frame portion. The frame is at least partially disposed within the insulating cavity. An upper hinge mount is disposed on the upper frame portion. A lower hinge mount is disposed on the lower frame portion. The lower frame portion has a closed outer periphery. A door is rotationally mounted to the cabinet via an upper hinge mounted to the upper hinge mount and a lower hinge mounted to the lower hinge mount.

20 Claims, 9 Drawing Sheets

(51) Int. Cl.
*F25D 23/06* (2006.01)
*E05D 7/081* (2006.01)
(52) U.S. Cl.
CPC ..... *E05Y 2900/31* (2013.01); *F25D 2323/021* (2013.01); *F25D 2323/024* (2013.01)
(58) Field of Classification Search
USPC ........................................................ 312/405
See application file for complete search history.

(56) References Cited

U.S. PATENT DOCUMENTS

| | | |
|---|---|---|
| 1,849,369 A | 3/1932 | Frost |
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss |
| 2,432,042 A | 12/1947 | W. E. Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,884,099 A * | 4/1959 | Nenzell ................. F16B 19/008 29/523 |
| 2,942,438 A | 6/1960 | Schmeling |
| 2,985,075 A | 5/1961 | Knutsson-Hall |
| 3,006,708 A | 10/1961 | Saunders et al. |
| 3,086,830 A | 4/1963 | Malia |
| 3,125,388 A | 3/1964 | Costantini et al. |
| 3,137,900 A | 6/1964 | Carbary |
| 3,157,306 A | 11/1964 | Courson |
| 3,218,111 A | 11/1965 | Steiner |
| 3,258,883 A | 7/1966 | Louis et al. |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,452,387 A | 7/1969 | Jerila et al. |
| 3,471,416 A | 10/1969 | Fijal |
| 3,518,716 A | 7/1970 | Larson |
| 3,597,850 A | 8/1971 | Jenkins |
| 3,607,169 A | 9/1971 | Coxe |
| 3,608,129 A | 9/1971 | Heyer et al. |
| 3,634,971 A | 1/1972 | Kesling |
| 3,635,536 A | 1/1972 | Lackey et al. |
| 3,688,384 A | 9/1972 | Mizushima et al. |
| 3,769,770 A | 11/1973 | Deschamps et al. |
| 3,788,094 A | 1/1974 | Benasutti et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherbum |
| 4,070,728 A | 1/1978 | Herman |
| 4,115,901 A | 9/1978 | Schmidt |
| 4,170,391 A | 10/1979 | Bottger |
| 4,189,805 A | 2/1980 | Backus |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick |
| 4,383,414 A | 5/1983 | Beitner |
| 4,396,362 A | 8/1983 | Thompson et al. |
| 4,417,382 A | 11/1983 | Schiff |
| 4,492,368 A | 1/1985 | DeLeeuw et al. |
| 4,529,368 A | 7/1985 | Makansi |
| 4,548,196 A | 10/1985 | Torobin |
| 4,550,576 A | 11/1985 | Tate, Jr. et al. |
| 4,583,796 A | 4/1986 | Nakajima et al. |
| 4,646,472 A | 3/1987 | Sugawara |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,690,468 A | 9/1987 | Lau |
| 4,696,078 A | 9/1987 | Stromquist |
| 4,745,015 A | 5/1988 | Cheng et al. |
| 4,774,740 A | 10/1988 | Gidseg et al. |
| 4,777,154 A | 10/1988 | Torobin |
| 4,787,121 A | 11/1988 | Racenis et al. |
| 4,805,293 A | 2/1989 | Buchser |
| 4,822,117 A * | 4/1989 | Boston, Jr. ............ F25D 23/062 29/455.1 |
| 4,864,691 A | 9/1989 | Gidseg et al. |
| 4,903,858 A * | 2/1990 | Clark .................... F25D 23/064 220/592.02 |
| 4,912,942 A | 4/1990 | Katterhenry et al. |
| 4,914,781 A | 4/1990 | Sokn et al. |
| 4,914,782 A | 4/1990 | Rupprechter |
| 4,917,841 A | 4/1990 | Jenkins |
| 4,958,890 A * | 9/1990 | Anderson ............. F25D 23/062 312/406.2 |
| 5,007,226 A | 4/1991 | Nelson |
| 5,018,328 A | 5/1991 | Cur et al. |
| 5,033,636 A | 7/1991 | Jenkins |
| 5,064,255 A * | 11/1991 | Inui ....................... E05D 15/502 312/405 |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,158,503 A | 10/1992 | Mitchell |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,222,792 A * | 6/1993 | Kai ....................... E05D 15/502 312/406 |
| 5,227,245 A | 7/1993 | Brands et al. |
| 5,231,811 A | 8/1993 | Andrepont et al. |
| 5,248,196 A | 9/1993 | Lynn et al. |
| 5,252,408 A | 10/1993 | Bridges et al. |
| 5,253,433 A | 10/1993 | Frey |
| 5,263,509 A | 11/1993 | Cherry et al. |
| 5,263,773 A | 11/1993 | Gable et al. |
| 5,265,954 A | 11/1993 | Keil |
| 5,273,801 A | 12/1993 | Barry et al. |
| 5,318,108 A | 6/1994 | Benson et al. |
| 5,340,208 A | 8/1994 | Hauck et al. |
| 5,349,832 A * | 9/1994 | Johnson .................... E05D 5/06 312/407 |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,419,640 A | 5/1995 | Doring |
| 5,433,056 A | 7/1995 | Benson et al. |
| 5,477,676 A | 12/1995 | Benson et al. |
| 5,483,770 A | 1/1996 | Marinoni |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Cospey et al. |
| 5,509,248 A | 4/1996 | Dellby et al. |

(56) References Cited

U.S. PATENT DOCUMENTS

| | | | |
|---|---|---|---|
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell |
| 5,768,837 A | 6/1998 | Sjoholm |
| 5,792,801 A | 8/1998 | Tsuda et al. |
| 5,813,454 A | 9/1998 | Potter |
| 5,826,780 A | 10/1998 | Nesser et al. |
| 5,827,385 A | 10/1998 | Meyer et al. |
| 5,834,126 A | 11/1998 | Sheu |
| 5,843,353 A | 12/1998 | De Vos et al. |
| 5,866,228 A | 2/1999 | Awata |
| 5,866,247 A | 2/1999 | Klatt et al. |
| 5,868,890 A | 2/1999 | Fredrick |
| 5,897,181 A * | 4/1999 | Avendano ............... F25D 23/062 29/525.11 |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,036,294 A | 3/2000 | Banicevic et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,141,830 A | 11/2000 | Shimooka |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,970 B1 | 7/2001 | Nam et al. |
| 6,294,595 B1 | 9/2001 | Tyagi et al. |
| 6,305,768 B1 | 10/2001 | Nishimoto |
| 6,308,376 B1 | 10/2001 | Koshikawa |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,568,035 B2 | 5/2003 | Zetti |
| 6,623,413 B1 | 9/2003 | Wynne |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 * | 2/2006 | Avendano ............... A47B 47/02 312/265.6 |
| 7,008,032 B2 | 3/2006 | Chekal et al. |
| 7,026,054 B2 | 4/2006 | Ikegawa et al. |
| 7,108,341 B2 * | 9/2006 | Myers ................... F25D 23/066 312/352 |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,284,390 B2 | 10/2007 | Van Meter et al. |
| 7,296,423 B2 | 11/2007 | Müller et al. |
| 7,316,125 B2 | 1/2008 | Uekado et al. |
| 7,322,209 B2 | 1/2008 | Hwang et al. |
| 7,334,293 B2 | 2/2008 | Erickson et al. |
| 7,343,757 B2 | 3/2008 | Egan et al. |
| 7,360,371 B2 | 4/2008 | Feinauer et al. |
| 7,406,749 B2 | 8/2008 | Herper |
| 7,449,227 B2 | 11/2008 | Echigoya et al. |
| 7,475,562 B2 | 1/2009 | Jackovin |
| 7,517,031 B2 | 4/2009 | Laible |
| 7,520,578 B2 | 4/2009 | Tarantik |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,987,558 B2 | 8/2011 | Beckmann et al. |
| 7,992,257 B2 | 8/2011 | Kim |
| 8,049,518 B2 | 11/2011 | Wern et al. |
| 8,057,144 B2 * | 11/2011 | Johnson ............... F16B 19/1072 411/34 |
| 8,074,469 B2 | 12/2011 | Hamel et al. |
| 8,079,652 B2 | 12/2011 | Laible et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,162,421 B2 | 4/2012 | Lim et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,254,103 B2 | 8/2012 | Park et al. |
| 8,266,923 B2 | 9/2012 | Bauer et al. |
| 8,281,558 B2 | 10/2012 | Hiemeyer et al. |
| 8,299,656 B2 | 10/2012 | Allard et al. |
| 8,307,502 B2 | 11/2012 | Bonomie et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,456,040 B2 | 6/2013 | Allard et al. |
| 8,491,070 B2 | 7/2013 | Davis et al. |
| 8,499,577 B2 | 8/2013 | Watson et al. |
| 8,506,026 B2 | 8/2013 | Kim et al. |
| 8,511,768 B2 | 8/2013 | Brachert |
| 8,516,845 B2 | 8/2013 | Wuesthoff et al. |
| 8,528,284 B2 | 9/2013 | Aspenson et al. |
| 8,572,808 B2 | 11/2013 | Bonomie et al. |

(56) References Cited

U.S. PATENT DOCUMENTS

| | | |
|---|---|---|
| 8,590,992 B2 | 11/2013 | Lim et al. |
| 8,650,712 B2 | 2/2014 | Wach et al. |
| 8,717,029 B2 | 5/2014 | Chae et al. |
| 8,720,008 B2 | 5/2014 | Dodge et al. |
| 8,739,568 B2 | 6/2014 | Allard et al. |
| 8,752,918 B2 | 6/2014 | Kang |
| 8,752,921 B2 * | 6/2014 | Gorz .................. F25D 23/062 312/406.2 |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,840,204 B2 | 9/2014 | Bauer et al. |
| 8,852,708 B2 | 10/2014 | Kim et al. |
| 8,864,253 B2 * | 10/2014 | Gorz .................. F25D 23/085 312/406 |
| 8,881,398 B2 | 11/2014 | Hanley et al. |
| 8,905,503 B2 | 12/2014 | Sahasrabudhe et al. |
| 8,925,344 B2 | 1/2015 | Mitchell et al. |
| 9,009,969 B2 | 4/2015 | Choi et al. |
| RE45,501 E | 5/2015 | Maguire |
| 9,052,135 B2 | 6/2015 | Trulaske, Sr. |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,115,928 B2 | 8/2015 | Akalan et al. |
| 9,125,546 B2 | 9/2015 | Kleemann et al. |
| 9,140,480 B2 | 9/2015 | Kuehl et al. |
| 9,170,045 B2 | 10/2015 | Oh et al. |
| 9,188,382 B2 | 11/2015 | Kim et al. |
| 8,955,352 B2 | 12/2015 | Lee et al. |
| 9,212,846 B2 | 12/2015 | Lee et al. |
| 9,221,210 B2 | 12/2015 | Wu et al. |
| 9,222,293 B2 | 12/2015 | Jenkinson |
| 9,228,386 B2 | 1/2016 | Thielmann et al. |
| 9,267,721 B2 | 2/2016 | Hunter |
| 9,267,727 B2 | 2/2016 | Lim et al. |
| 9,303,915 B2 | 4/2016 | Kim et al. |
| 9,322,592 B2 | 4/2016 | Kim et al. |
| 9,328,951 B2 | 5/2016 | Shin et al. |
| 9,328,954 B2 | 5/2016 | Kang et al. |
| 9,353,984 B2 | 5/2016 | Kim et al. |
| 9,410,732 B2 | 8/2016 | Choi et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,593,518 B2 | 3/2017 | Downs et al. |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,790,722 B2 | 10/2017 | Sun et al. |
| 9,791,204 B2 | 10/2017 | Kim et al. |
| 9,823,011 B2 | 11/2017 | Kempte |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0173883 A1 | 9/2003 | Koons |
| 2004/0012315 A1 * | 1/2004 | Grace .................. F25D 23/062 312/406 |
| 2004/0178707 A1 | 9/2004 | Avendano et al. |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2005/0262663 A1 | 12/2005 | Lee |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0263571 A1 | 11/2006 | Tsunetsugu et al. |
| 2007/0001563 A1 | 1/2007 | Park et al. |
| 2007/0099502 A1 | 5/2007 | Ferinauer et al. |
| 2007/0176526 A1 | 8/2007 | Gomoll et al. |
| 2007/0266654 A1 | 11/2007 | Noale |
| 2008/0048540 A1 | 2/2008 | Kim |
| 2008/0120807 A1 | 5/2008 | Heger |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Nuemann |
| 2009/0058244 A1 | 3/2009 | Cho et al. |
| 2009/0077995 A1 | 3/2009 | Ihle et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horii et al. |
| 2011/0315693 A1 | 12/2011 | Cur et al. |
| 2012/0000234 A1 | 1/2012 | Adamski et al. |
| 2012/0060544 A1 | 3/2012 | Lee et al. |
| 2012/0080991 A1 | 4/2012 | Wilson |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCraken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |

(56) References Cited

U.S. PATENT DOCUMENTS

| | | | |
|---|---|---|---|
| 2013/0257256 A1* | 10/2013 | Allard | F25D 23/062 312/406 |
| 2013/0257257 A1 | 10/2013 | Cur et al. | |
| 2013/0264439 A1 | 10/2013 | Allard et al. | |
| 2013/0270732 A1 | 10/2013 | Wu et al. | |
| 2013/0285527 A1 | 10/2013 | Choi et al. | |
| 2013/0293080 A1 | 11/2013 | Kim et al. | |
| 2013/0305535 A1 | 11/2013 | Cur et al. | |
| 2013/0328472 A1 | 12/2013 | Shim et al. | |
| 2014/0009055 A1 | 1/2014 | Cho et al. | |
| 2014/0097733 A1 | 4/2014 | Seo et al. | |
| 2014/0132144 A1 | 5/2014 | Kim et al. | |
| 2014/0166926 A1 | 6/2014 | Lee et al. | |
| 2014/0171578 A1 | 6/2014 | Meyer et al. | |
| 2014/0190978 A1 | 7/2014 | Bowman et al. | |
| 2014/0196305 A1 | 7/2014 | Smith | |
| 2014/0216706 A1 | 8/2014 | Melton et al. | |
| 2014/0232250 A1 | 8/2014 | Kim et al. | |
| 2014/0260332 A1 | 9/2014 | Wu | |
| 2014/0346942 A1* | 11/2014 | Kim | F25D 23/067 312/404 |
| 2014/0364527 A1 | 12/2014 | Wintermantel et al. | |
| 2015/0015133 A1 | 1/2015 | Carbajal et al. | |
| 2015/0027628 A1 | 1/2015 | Cravens et al. | |
| 2015/0059126 A1 | 3/2015 | Dubina et al. | |
| 2015/0059399 A1 | 3/2015 | Hwang et al. | |
| 2015/0115790 A1 | 4/2015 | Ogg | |
| 2015/0147514 A1 | 5/2015 | Shinohara et al. | |
| 2015/0159936 A1 | 6/2015 | Oh et al. | |
| 2015/0168050 A1 | 6/2015 | Cur et al. | |
| 2015/0184923 A1 | 7/2015 | Jeon | |
| 2015/0190840 A1 | 7/2015 | Muto et al. | |
| 2015/0192347 A1* | 7/2015 | Cho | F25D 21/04 62/272 |
| 2015/0241115 A1 | 8/2015 | Strauss et al. | |
| 2015/0241118 A1 | 8/2015 | Wu | |
| 2015/0265491 A1* | 9/2015 | Henshue | E01C 5/001 404/19 |
| 2015/0285551 A1 | 10/2015 | Aiken et al. | |
| 2016/0084567 A1 | 3/2016 | Fernandez et al. | |
| 2016/0116100 A1 | 4/2016 | Thiery et al. | |
| 2016/0123055 A1 | 5/2016 | Ueyama | |
| 2016/0161175 A1 | 6/2016 | Benold et al. | |
| 2016/0178267 A1 | 6/2016 | Hao et al. | |
| 2016/0178269 A1 | 6/2016 | Hiemeyer et al. | |
| 2016/0235201 A1 | 8/2016 | Soot | |
| 2016/0240839 A1 | 8/2016 | Umeyama et al. | |
| 2016/0258671 A1 | 9/2016 | Allard et al. | |
| 2016/0290702 A1 | 10/2016 | Sexton et al. | |
| 2016/0348957 A1 | 12/2016 | Hitzelberger et al. | |
| 2017/0003069 A1 | 1/2017 | Moertl et al. | |
| 2017/0038126 A1 | 2/2017 | Lee et al. | |
| 2017/0130502 A1 | 5/2017 | Collene | |
| 2017/0157809 A1 | 6/2017 | Deka et al. | |
| 2017/0176086 A1 | 6/2017 | Kang | |
| 2017/0184341 A1* | 6/2017 | Grimm | F25D 21/04 |
| 2017/0191210 A1 | 7/2017 | Jung et al. | |
| 2017/0191746 A1 | 7/2017 | Seo | |
| 2018/0031302 A1 | 2/2018 | Park et al. | |

FOREIGN PATENT DOCUMENTS

| | | |
|---|---|---|
| CA | 2259665 | 1/1998 |
| CA | 2640006 | 8/2007 |
| CN | 1158509 | 9/1997 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 12/2011 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| DE | 1150190 | 6/1963 |
| DE | 4110292 A1 | 10/1992 |
| DE | 19818890 | 11/1999 |
| DE | 19915311 | 10/2000 |
| DE | 102007058690 A1 | 6/2009 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0480451 | 4/1992 |
| EP | 0645576 A1 | 3/1995 |
| EP | 0691518 | 1/1996 |
| EP | 0260699 | 3/1998 |
| EP | 0860669 | 8/1998 |
| EP | 1087186 | 3/2001 |
| EP | 1200785 | 5/2002 |
| EP | 1243880 | 9/2002 |
| EP | 1484563 | 12/2004 |
| EP | 1496322 | 1/2005 |
| EP | 1505359 | 2/2005 |
| EP | 1602425 A1 | 12/2005 |
| EP | 2543942 A2 | 1/2013 |
| EP | 2607073 | 6/2013 |
| EP | 2789951 | 10/2014 |
| EP | 2878427 A1 | 6/2015 |
| FR | 2668180 A1 | 4/1992 |
| FR | 2980963 | 4/2013 |
| FR | 2991698 A1 | 12/2013 |
| GB | 837929 | 6/1960 |
| GB | 1214548 | 12/1970 |
| JP | S4828353 | 8/1973 |
| JP | S5157777 | 5/1976 |
| JP | S59191588 | 12/1984 |
| JP | H06159922 | 6/1994 |
| JP | H071479 | 1/1995 |
| JP | H07167377 | 7/1995 |
| JP | H08300052 | 11/1996 |
| JP | H08303686 | 11/1996 |
| JP | H09166271 | 6/1997 |
| JP | H10113983 | 5/1998 |
| JP | H11311395 | 11/1999 |
| JP | H11336990 | 12/1999 |
| JP | 2000097390 | 4/2000 |
| JP | 20000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 3438948 | 8/2003 |
| JP | 3478771 | 12/2003 |
| JP | 2004303695 | 10/2004 |
| JP | 2005114015 | 4/2005 |
| JP | 2005164193 | 6/2005 |
| JP | 2005256849 | 9/2005 |
| JP | 2006-77792 | 3/2006 |
| JP | 2006161945 | 6/2006 |
| JP | 3792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 4545126 | 9/2010 |
| JP | 2010236770 | 10/2010 |
| JP | 2010276309 | 12/2010 |

(56) References Cited

FOREIGN PATENT DOCUMENTS

| | | |
|---|---|---|
| JP | 2011002033 | 1/2011 |
| JP | 2011069612 | 4/2011 |
| JP | 4779684 | 9/2011 |
| JP | 2011196644 | 10/2011 |
| JP | 2012026493 | 2/2012 |
| JP | 4897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| JP | 2015204928 A | 11/2015 |
| KR | 20020057547 | 7/2002 |
| KR | 20020080938 | 10/2002 |
| KR | 20030083812 | 11/2003 |
| KR | 100620025 B1 | 9/2006 |
| KR | 20090026045 | 3/2009 |
| KR | 101017776 | 2/2011 |
| KR | 20120007241 | 1/2012 |
| KR | 20120046621 | 5/2012 |
| KR | 20120051305 | 5/2012 |
| RU | 2061925 C1 | 6/1996 |
| RU | 2077411 C1 | 4/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2253792 C2 | 6/2005 |
| RU | 2349618 C2 | 3/2009 |
| RU | 2414288 C2 | 3/2011 |
| RU | 2448208 C1 | 4/2012 |
| RU | 2529525 C1 | 9/2014 |
| SU | 648780 A1 | 2/1979 |
| SU | 01307186 A1 | 4/1987 |
| WO | 1998049506 | 11/1998 |
| WO | 02060576 A1 | 4/1999 |
| WO | 9920961 A1 | 4/1999 |
| WO | 9920964 A1 | 4/1999 |
| WO | 199920964 | 4/1999 |
| WO | 200160598 | 8/2001 |
| WO | 200202987 | 1/2002 |
| WO | 2002052208 | 4/2002 |
| WO | 03072684 A1 | 9/2003 |
| WO | 2003089729 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2012023705 | 2/2012 |
| WO | 2012026715 | 3/2012 |
| WO | 2012031885 | 3/2012 |
| WO | 2012043990 | 4/2012 |
| WO | 2012044001 | 4/2012 |
| WO | 2012085212 | 6/2012 |
| WO | 2012119892 | 9/2012 |
| WO | 2012152646 | 11/2012 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |
| WO | WO-2017192121 A1 * | 11/2017 ........... F25D 23/028 |
| WO | WO-2018101955 A1 * | 6/2018 ................ F24C 1/00 |

* cited by examiner

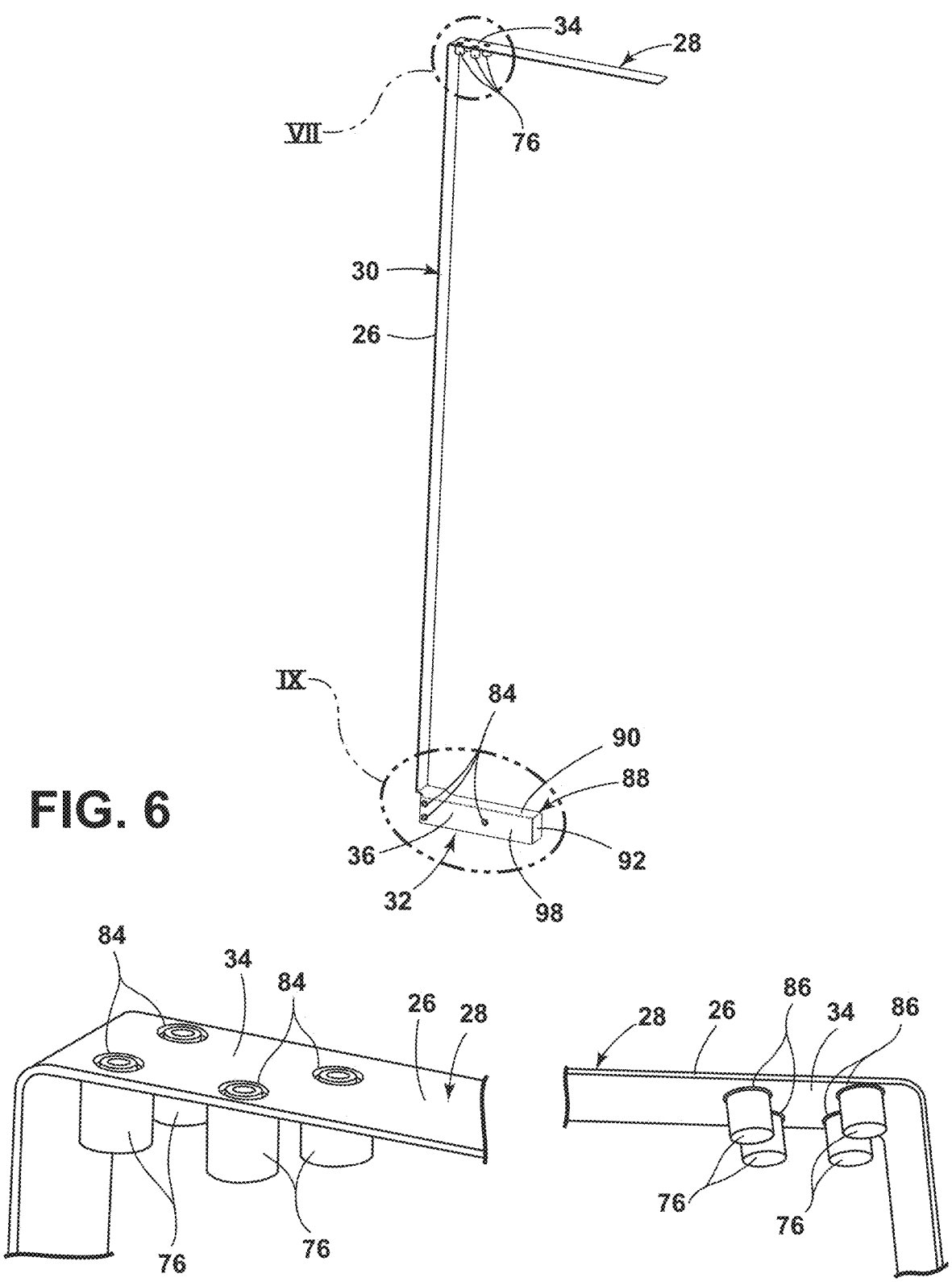

HINGE SUPPORT ASSEMBLY

FIELD OF THE DEVICE

The present disclosure generally relates to support structures for appliances, and more specifically, to a frame incorporated as part of the appliance for supporting hinges that are coupled to the appliance and a door.

BACKGROUND

Refrigerated appliances commonly define one or more compartments therein that are accessible through a door. The door is coupled to the appliance through a hinge. It is desired to maximize support for the hinge.

SUMMARY

According to one aspect of the present disclosure, an appliance is disclosed. The appliance includes a cabinet having a wrapper, a liner, and a trim breaker. The wrapper, the liner, and the trim breaker define an insulating cavity therebetween. An insulating material is disposed within the insulating cavity. A frame includes an upper frame portion, a vertical frame portion, and a lower frame portion. The frame is at least partially disposed within the insulating cavity. An upper hinge mount is disposed on the upper frame portion. A lower hinge mount is disposed on the lower frame portion. The lower frame portion has a closed outer periphery. A door is rotationally mounted to the cabinet via an upper hinge mounted to the upper hinge mount and a lower hinge mounted to the lower hinge mount.

According to another aspect of the present disclosure, an appliance is disclosed. The appliance includes a cabinet defining an insulating cavity. A frame includes an upper frame portion, a vertical frame portion, and a lower frame portion. The lower frame portion has a closed outer periphery. A first attachment receptacle is disposed within an upper hinge mount. A second attachment receptacle is disposed within a lower hinge mount. A door is rotationally mounted to the cabinet via an upper hinge mounted to the upper hinge mount and a lower hinge mounted to the lower hinge mount.

According to yet another aspect of the present disclosure, an appliance is disclosed. The appliance includes a cabinet defining an insulating cavity. A frame is disposed within the insulating cavity and includes an upper frame portion, a vertical frame portion, and a lower frame portion. The lower frame portion has a closed outer periphery. An upper hinge mount is disposed on the upper frame portion. A lower hinge mount is disposed on the lower frame portion. A door is rotationally mounted to the cabinet via a hinge mounted to the frame.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 6 is a side perspective view of the hinge support frame, according to various embodiments;

FIG. 7 is an enhanced top perspective view of the area VII of FIG. 6 illustrating an upper frame portion of the hinge support frame, according to various embodiments;

FIG. 8 is an enhanced lower perspective view of the area VII of FIG. 6 illustrating an upper frame portion of the hinge support frame, according to various embodiments;

DETAILED DESCRIPTION OF EMBODIMENTS

Figure 1:
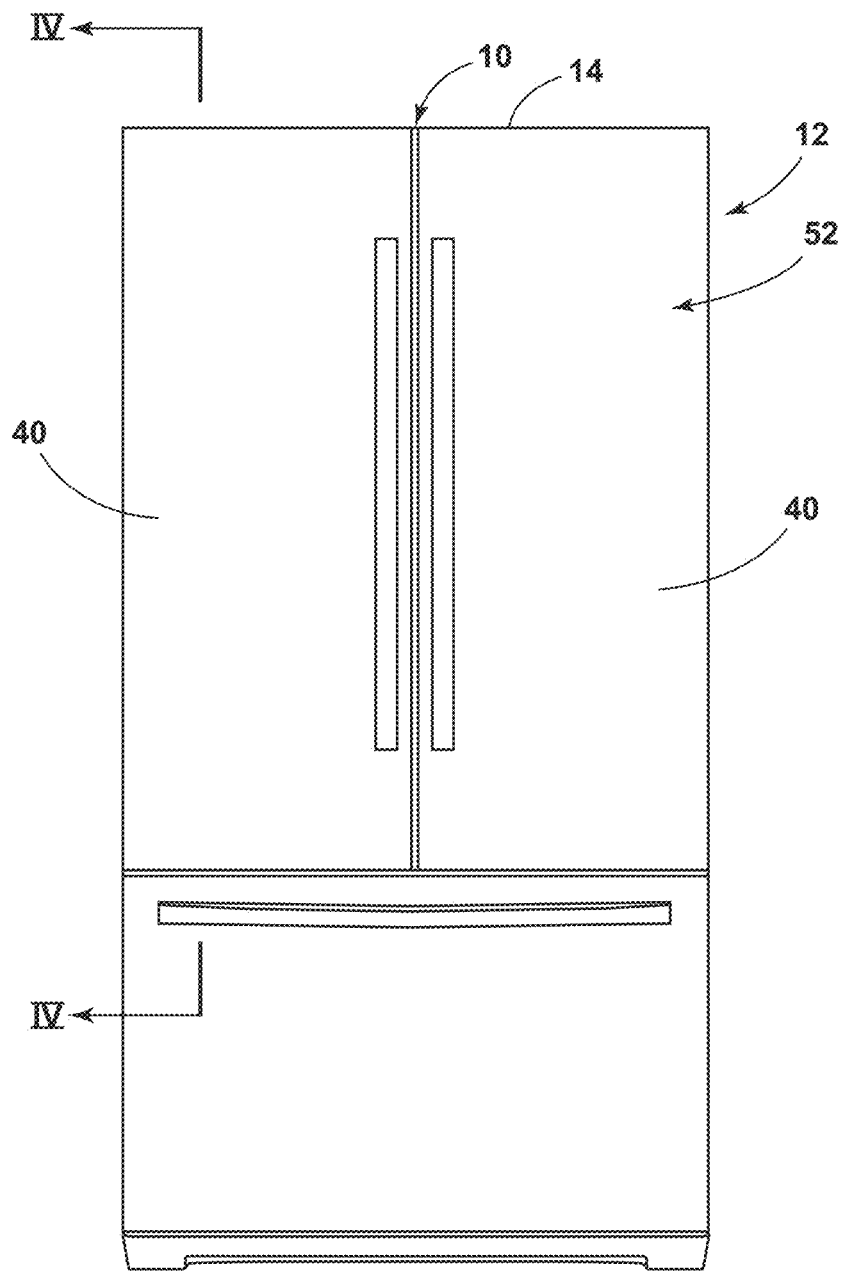
FIG. 1 is a front elevational view of an appliance incorporating a hinge support frame with a pair of doors in a closed position, according to various embodiments.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As illustrated in FIGS. 1-14, a cabinet 10 for an appliance 12 may include a wrapper 14, a liner 16, and a trim breaker 18 that defines a joint extending between portions of the wrapper 14 and the liner 16. The wrapper 14, the liner 16, and the trim breaker 18 define an insulating cavity 20 within the cabinet 10. A vacuum insulated structure 22 can be disposed within the insulating cavity 20. It is contemplated that the vacuum insulated structure 22 can be a vacuum insulated panel disposed within the insulating cavity 20. The vacuum insulated structure 22 can also be defined by an insulating material 24 disposed within the insulating cavity 20, where gas is expressed from the insulating cavity 20 to define an at least partial vacuum of the vacuum insulated structure 22.

Referring again to FIGS. 1-14, a hinge support frame 26 includes an upper frame portion 28, a vertical frame portion 30, and a lower frame portion 32. The frame may be at least partially disposed within the insulating cavity 20. An upper hinge mount 34 is disposed on the upper frame portion 28. A lower hinge mount 36 is disposed on the lower frame portion 32. According to various embodiments, the lower frame portion 32 has a closed outer periphery 88. A door 40 is rotationally mounted to the cabinet 10 via an upper hinge 42 mounted to the upper hinge mount 34 and a lower hinge mounted to the lower hinge mount 36. The upper and lower hinge mounts 34, 36 receive downward forces 46, rotational forces 48, torsion 50, shear stresses, etc. exerted by the door 40 onto the cabinet 10. The upper and lower hinge mounts 34, 36 may transfer these downward forces 46, rotational forces 48, and/or torsion 50 to the vertical frame portion 30.

Figure 2:
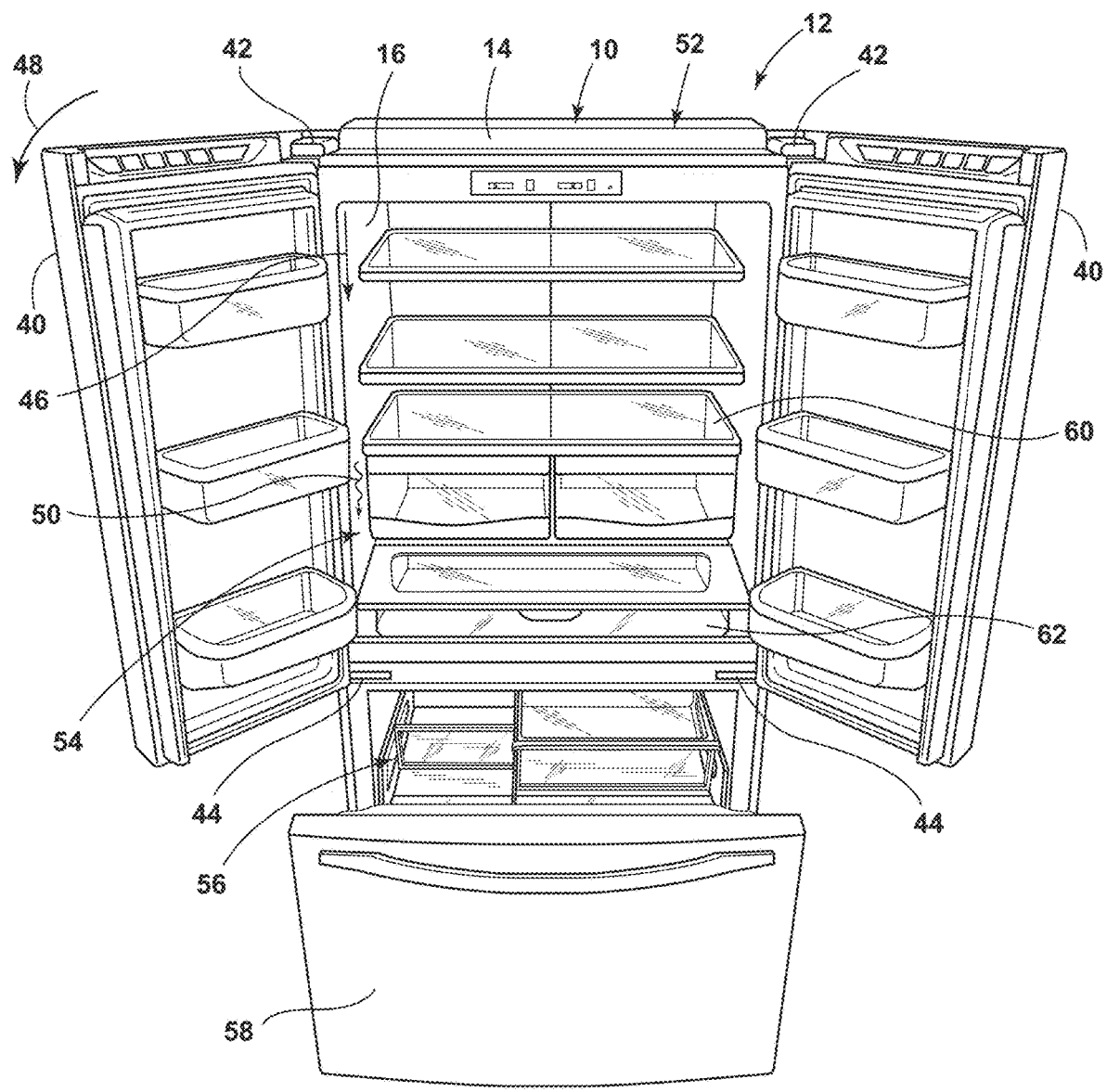
FIG. 2 is a front perspective view of the appliance of FIG. 1 with the pair of doors in an open position.

Referring to FIGS. 1 and 2, the appliance 12 is configured as a refrigerator 52 that includes a refrigerator compartment 54 and a freezer compartment 56. The cabinet 10 of the appliance 12 can include an interior mullion 64 that defines the plurality of interior compartments 54, 56. A pair of doors 40 is operable between a closed position (FIG. 1) and an open position (FIG. 2) to selectively provide access to the refrigerator compartment 54, while a drawer 58 may be used to selectively provide access to the freezer compartment 56. The configuration of the refrigerator 52 of FIGS. 1 and 2 is exemplary only and the present concept is contemplated for use in all refrigerator styles including, but not limited to, side-by-side refrigerators, whole refrigerator and freezers, and refrigerators with upper freezer compartments.

Referring now to FIG. 2, the pair of doors 40 is shown in an open position to reveal an interior of the refrigerator compartment 54. It is contemplated that the refrigerator compartment 54 may include any number of shelves 60 or drawers 62 disposed therein for storing various food items within the refrigerator compartment 54. The freezer compartment 56 may also include any number of shelves 60 and/or drawers 62. Cooling components are operably coupled with the refrigerator compartment 54 and/or the freezer compartment 56 and may include a compressor, a condenser, an expansion valve, an evaporator, a plurality of conduits, and other related components used for cooling the refrigerator and freezer compartments 54, 56.

Figure 3:
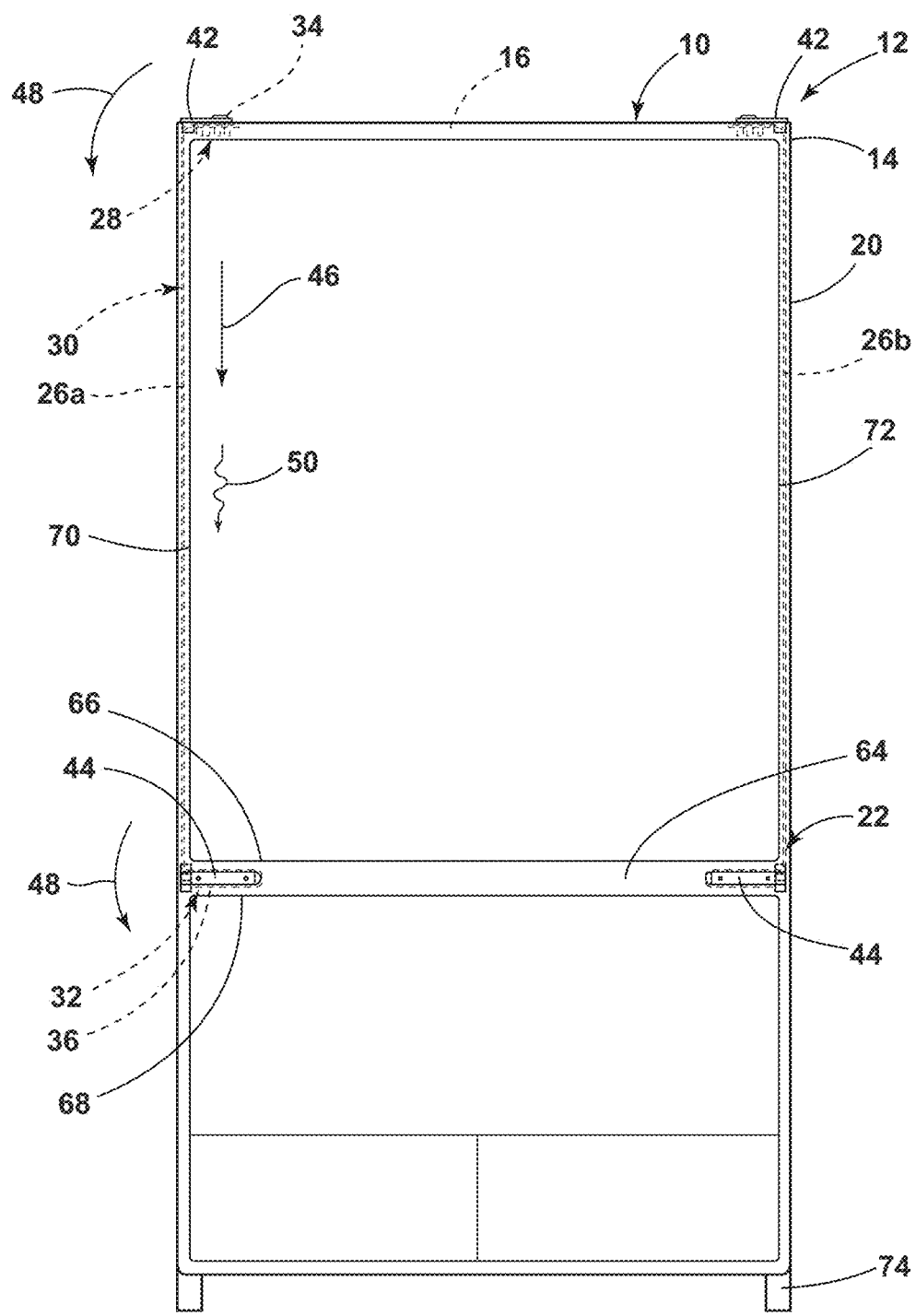
FIG. 3 is a front elevational view of the hinge support frame incorporated as part of the cabinet of the appliance, according to various embodiments.
Figure 4:
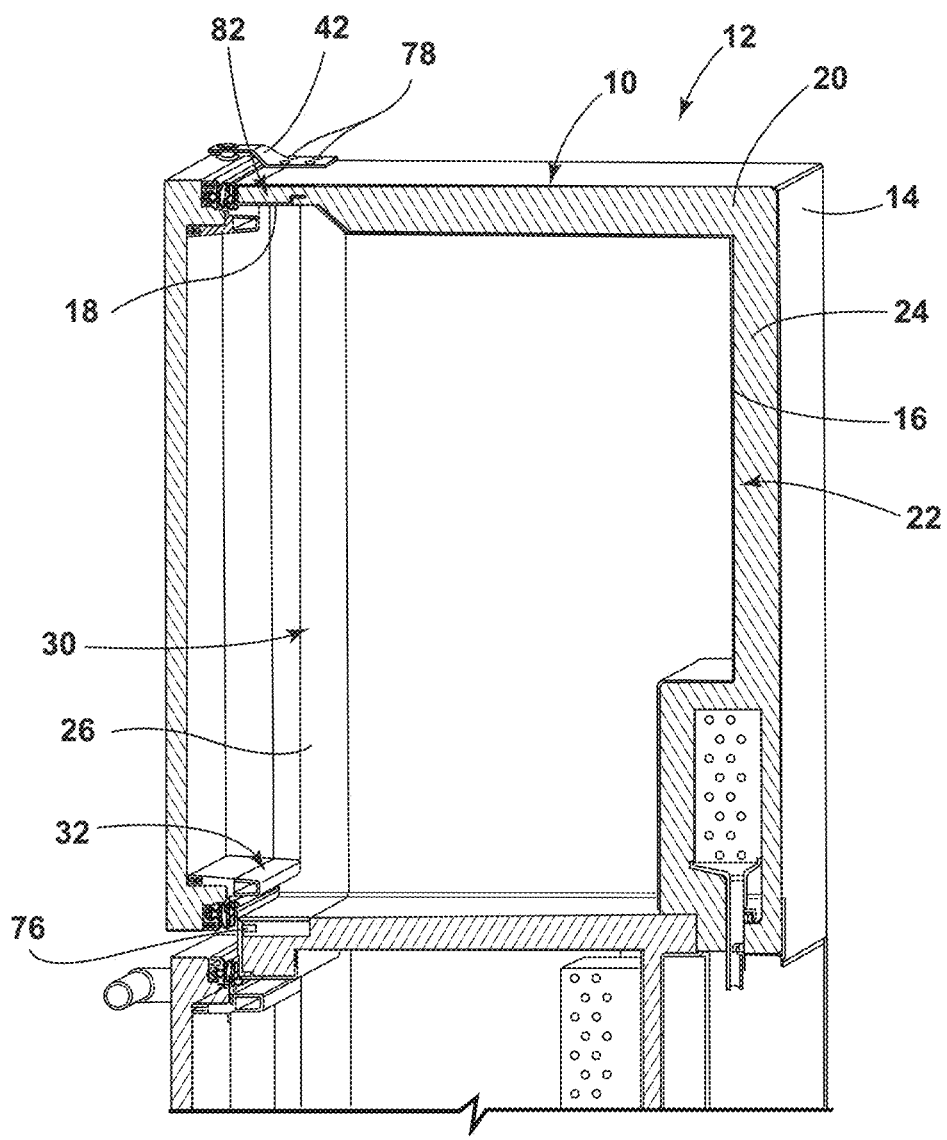
FIG. 4 is a cross-sectional view of the appliance of FIG. 1 taken along line IV-IV.
Figure 5:
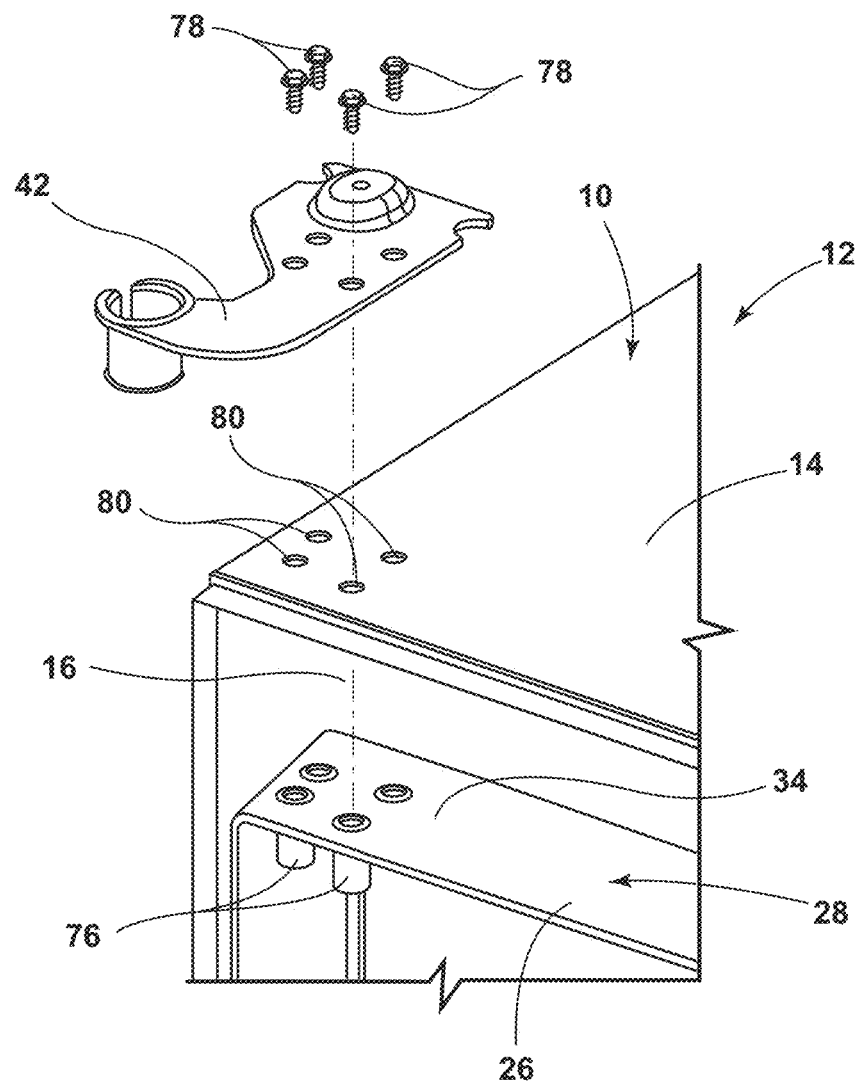
FIG. 5 is a partially exploded top perspective view of an upper hinge and upper hinge mount incorporated within the hinge support frame.
Figure 9:
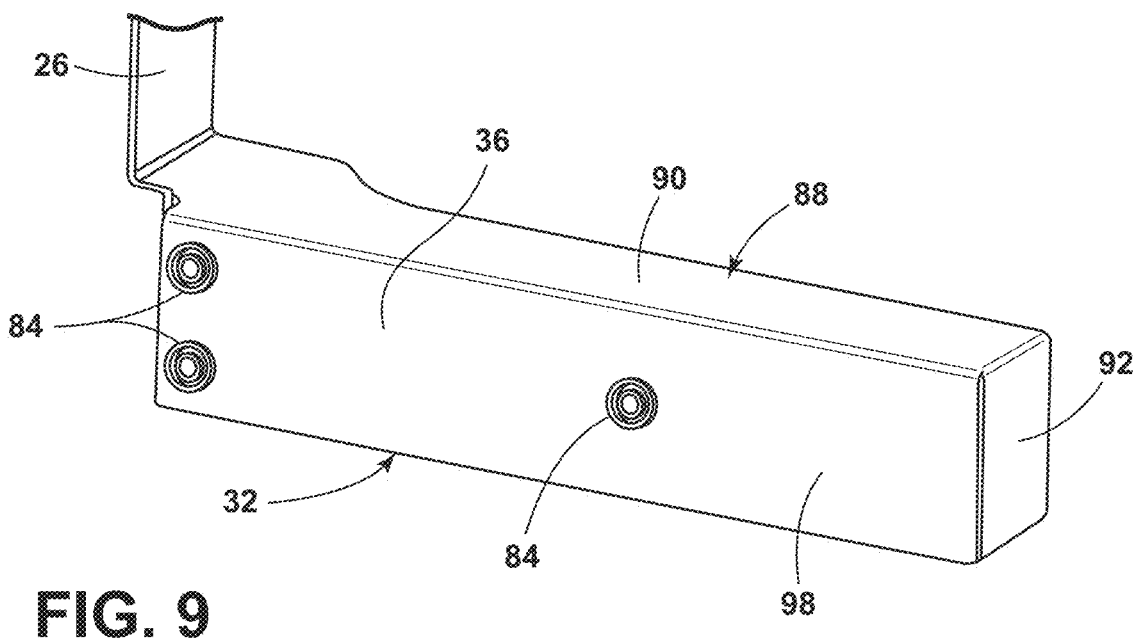
FIG. 9 is an enhanced front perspective view of the area IX of FIG. 6 illustrating a lower frame portion of the hinge support frame, according to various embodiments.
Figure 10:
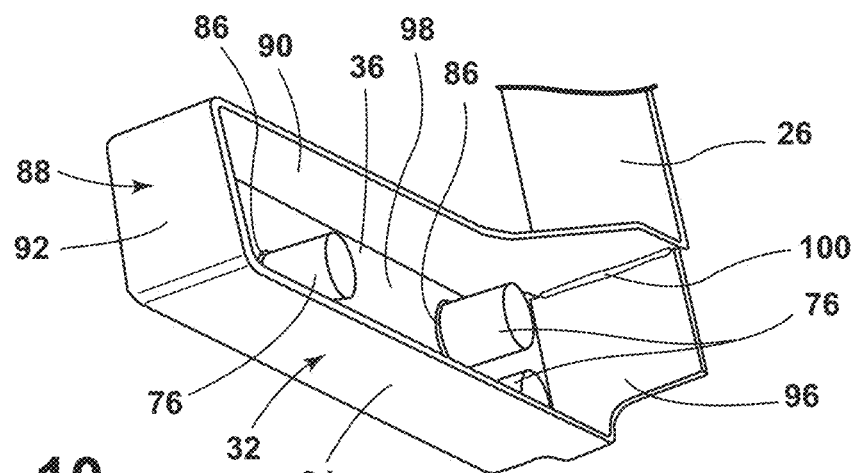
FIG. 10 is an enhanced side perspective view of the area IX of FIG. 6 illustrating a lower frame portion of the hinge support frame, according to various embodiments.
Figure 11:
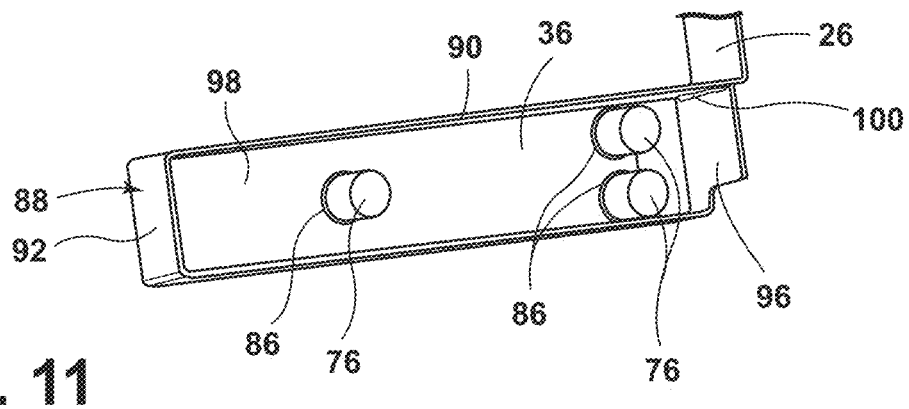
FIG. 11 is an enhanced rear perspective view of the area IX of FIG. 6 illustrating a lower frame portion of the hinge support frame, according to various embodiments.

Referring to FIGS. 3-5, the upper and lower hinge mounts 34, 36 serve to provide hinge attachment points to which the various upper and lower hinges 42, 44 of the appliance 12 can be fixed and secured. The upper or lower hinges 42, 44 may further serve to vertically and rotationally support the various doors 40 of the appliance 12 and contents disposed within the doors 40 of the appliance 12. In this manner, when the doors 40 are attached to the upper or lower hinges 42, 44, the weight of the doors 40 is transferred to the frame 26. Accordingly, the weight of the doors 40 and the weight of contents placed within the doors 40 is directed to the frame 26, such that the downward forces 46, rotational forces 48, and/or torsion 50 applied by the doors 40 to minimize the effect on the structural integrity of the vacuum insulated structure 22 of the appliance 12. These forces can then be transferred through the pair of frames 26a, 26b to a base 74 of the appliance 12 or out to structural portions of the wrapper 14 and then to the base 74 of the appliance 12.

Referring to FIG. 3, the lower frame portion 32 can be disposed within the interior mullion 64. It is also contemplated that the trim breaker 18 can also define a portion of the interior mullion 64. According to various embodiments, the interior mullion 64 can include an upper trim breaker 66 and a lower trim breaker 68, where the lower frame portion 32 extends vertically between the upper and lower trim breakers 66, 68.

Referring to FIG. 4, the insulating cavity 20 is defined by the wrapper 14, the liner 16, and the trim breaker 18 and can be a hermetically sealed cavity. According to various examples, the insulating cavity 20 may include one or more vacuum insulated structures 22 to aid in decreasing thermal conductivity between an interior and exterior of the cabinet 10. In vacuum insulated structures 22, creating a vacuum within the insulating cavity 20 decreases heat transmission through the vacuum insulated structure 22. By creating a vacuum between the spaces intended to be thermally isolated, heat conduction is minimized because there is no, or less, material (e.g., air) to transfer the thermal energy between the thermally isolated spaces. The insulating cavity 20 may have an air pressure of less than about 1 atm, about 0.5 atm, about 0.4 atm, about 0.3 atm, about 0.2 atm, about 0.1 atm, or less than about 0.01 atm.

The upper hinge mounts 34 and the lower hinge mounts 36 can include attachment receptacles 76 that serve to receive fasteners 78 for coupling the upper or lower hinges 42, 44, respectively, to an opposing side of the wrapper 14 from the frame 26. The attachment receptacles 76 can be welded, adhered, or otherwise sealingly attached to a portion of the frame 26, such that a hermetic seal of the insulating cavity 20 is maintained during and after attachment of the upper and lower hinges 42, 44 to the upper and lower hinge mounts 34, 36, respectively. Accordingly, the attachment receptacles 76 are adapted to maintain the fasteners 78 separate from the insulating cavity 20 as the fasteners 78 may not puncture, or otherwise damage, the integrity of the vacuum insulated structure 22.

Referring again to FIG. 4, in some embodiments, the frame 26 can be integrally and/or directly attached to the wrapper 14 of the cabinet 10 as a thickened or reinforced portion of the wrapper 14. The thickening or reinforcement of the wrapper 14 can be accomplished through the addition of structural material at the portions described above or through folding over of the wrapper 14 to form thickened portions of the wrapper 14.

Referring to FIG. 5, one or more attachment apertures 80 are defined by the wrapper 14 proximately to the upper hinge mount 34 and are configured to receive the fasteners 78 therethrough. The upper frame portion 28 can be disposed within the insulating cavity 20 and can be aligned with the apertures 80. In this manner, the attachment receptacles 76 may be visible through the wrapper 14.

The upper hinge mount 34 is integrated within the upper frame portion 28 and includes one or more attachment receptacles 76 for receiving fasteners 78 for attaching the upper hinge 42 to the upper hinge mount 34. Similarly, the lower hinge mount 36 is integrated within the lower frame portion 32 and includes the one or more attachment receptacles 76 for receiving fasteners 78 for attaching the lower hinge 44 to the lower hinge mount 36. Again, the use of the attachment receptacles 76 can at least partially define the hermetically sealed insulating cavity 20. In some embodiments, the interior mullion 64 can include a foamed-in insulating material 24 that is kept at atmosphere and is not hermetically sealed or pressurized. In such an embodiment, the use of the attachment receptacles 76 for sealing the engagement between the lower hinges 44 and the lower hinge mounts 36 is still effective at minimizing the transfer of gas and thermal energy through the attachment points defined by the lower hinge mounts 36. The attachment receptacles 76, as with the upper hinge mounts 34, are adapted to receive the fasteners 78 for the lower hinges 44 and prevent the fasteners 78 from extending through the attachment receptacles 76, such that the fasteners 78 do not extend into the insulating cavity 20 within the interior mullion 64.

When the various fasteners 78 are attached to the upper or lower hinges 42, 44 and to the upper and lower hinge mounts 34, 36, the various fasteners 78 can extend through the one or more attachment apertures 80 and into the attachment receptacle 76. Leading ends of each fastener 78 may remain within the attachment receptacle 76 thereby preventing penetration into the insulating cavity 20.

Referring to FIGS. 6-8, the frame 26 includes the upper frame portion 28 that may extend along a top portion 82 (FIG. 4) of the cabinet 10 and defines the at least one upper hinge mount 34. The at least one upper hinge mount 34 can include one or more of upper hinge mounts 34 that are positioned proximate opposing left and right sidewalls 70, 72 (FIG. 3), respectively, of the cabinet 10. The frame 26 can also include a lower frame portion 32 that defines the at least one lower hinge mount 36. The at least one lower hinge mount 36 can include one or more of lower hinge mounts 36 that are positioned proximate the right and left sidewalls 70, 72, respectively, and in alignment with the one or more of upper hinge mounts 34 to provide mounting locations for a pair of French doors 40 that are opposingly and rotationally operable between open and closed positions. In various embodiments, the cabinet may include a pair of frames 26a, 26b (FIG. 3) that are disposed proximately to the right and left sidewalls 70, 72. According to the various embodiments, the pair of frames 26a, 26b can extend from the top portion 82 (FIG. 4) of the cabinet 10 down to a base 74 of a cabinet 10 such that various loads placed upon the pair of frames 26a, 26b can be transferred to the base 74 of the appliance 12 and into feet or rollers of the appliance 12 to be transferred to the floor, ground, or other substrate surface.

Referring to FIGS. 6-17, the frame 26 may be formed from a metallic, or other malleable, material and multiple portions (e.g., upper frame portion 28, vertical frame portion 30, and/or lower frame portion 32) of the frame 26 may be formed as a unitary assembly. For example, as illustrated in FIGS. 6-11, the upper frame portion 28, the vertical frame portion 30, and the lower frame portion 32 may be formed from a single component.

One or more voids 84 are then punched, or otherwise formed, in the upper frame portion 28 and the lower frame portion 32. The attachment receptacles 76 are then aligned with the voids 84 and attached thereto. As described above, the receptacles 76 may be hermetically sealed to the frame 26 through integral formation and/or through the use of an air non-permeable material 86. For example, according to various embodiments, an air non-permeable weldment may attach the attachment receptacles 76 to the frame 26.

The upper frame portion 28 may be substantially planar while the lower frame portion 32 may include a closed outer periphery 88. As illustrated in FIGS. 6-14, the closed outer periphery 88 of the lower frame portion 32 includes a top section 90, an outer section 92, a bottom section 94, an inner section 96, and a front section 98. The inner section 96 may be attached, coupled, or integrally formed with the top section 90 and/or the vertical frame portion 30. In some embodiments, an attachment material 100, such as weldment and/or an adhesive may be used to couple sections of the lower frame portion 32 to create the closed geometry. As used herein, "closed geometry" is defined as any geometrical shape that includes outer sections (i.e. the top section 90, the outer section 92, the bottom section 94, the inner section 96) that are coupled, attached, integrally formed with, in contact with, and/or supported by additional sections or portions of the frame 26 on opposing end portions. In additional embodiments, the lower frame portion 32 may have a cross section of any other closed shape including, but not limited to, circular, oval, rectangular, and/or any other polygonal cross sections.

According to various embodiments, each section 90, 92, 94, 96, 98 that forms the lower frame portion 32 may be formed from a single component. The sections 90, 92, 94, 96, 98 may be bent into any desired cross-sectional shape. Similarly, the upper frame portion 28 may be placed into a final orientation through any known manufacturing process. For example, the frame 26 may be disposed into a desired orientation through processes including, and not limited to, up-action air bending, V bending, R bending, hemming, seaming, coining, bottoming, forming, wiping, folding-type bending, custom bending, and so on.

Figure 12:
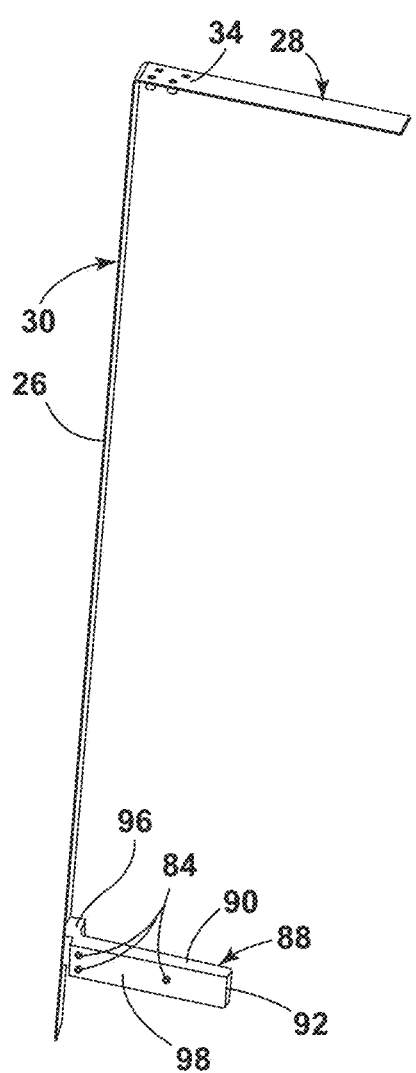
FIG. 12 is a front perspective view of the hinge support frame, according to an alternate embodiment.
Figure 13:
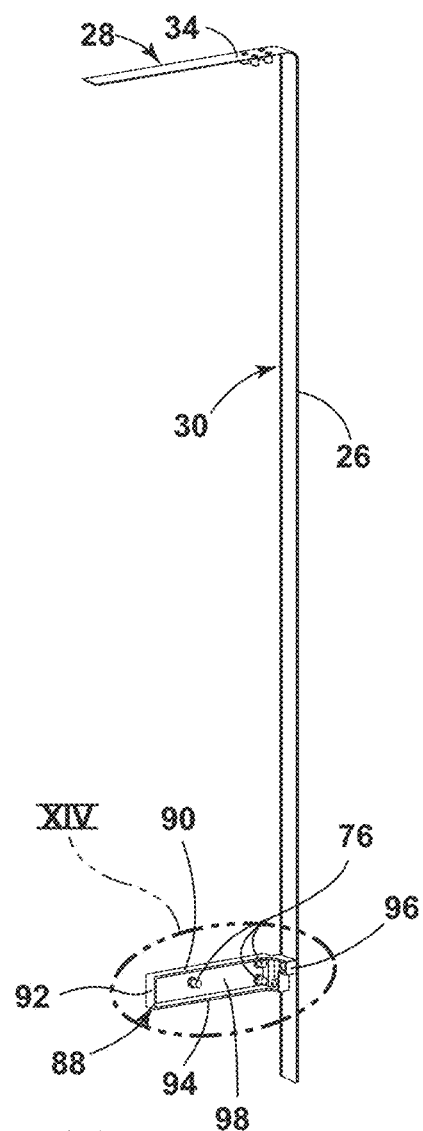
FIG. 13 is a rear perspective view of the hinge support frame, according to the embodiment of FIG. 12.
Figure 14:
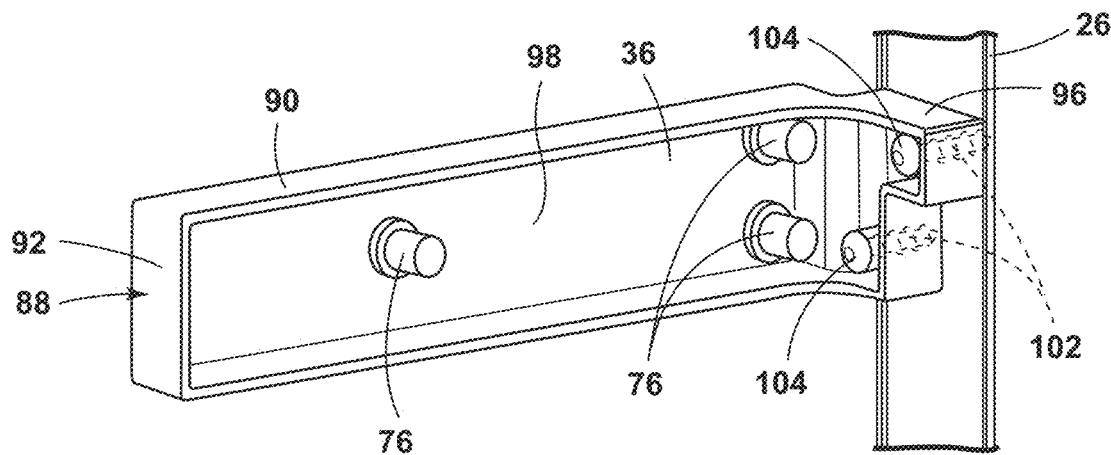
FIG. 14 is an enhanced rear perspective view of the area XIV of FIG. 13.

Referring to FIGS. 12-14, the upper frame portion 28 and the vertical frame portion 30 may be formed from a single component while the lower frame portion 32 is later attached thereto. The lower frame portion 32 may be a separate component that is attached to the vertical frame portion 30 and/or to the cabinet 10 through welding, fasteners 102, combinations thereof, and/or any other attachment mechanisms. Moreover, the lower frame portion 32 may have a closed geometry, as described above, that is formed through any manufacturing process. In embodiments in which the lower frame portion 32 is attached to the vertical frame portion 30, the lower frame portion 32 may include coupling receptacles 104 for disposing the fasteners 102 through the frame 26 thereinto. The coupling receptacles 104 may be hermetically sealed. The fasteners 102 that couple the lower frame portion 32 to the vertical frame portion 30 and/or to the cabinet 10 may be of a similar size or of a different size to the fasteners 78 utilized for coupling the upper and lower hinges 42, 44 to the upper and lower hinge mounts 34, 36, respectively.

In some embodiments, the manufacturing process used to form the upper frame portion 28 and/or the vertical frame portion 30 may be different from that used to form the lower frame portion 32. For example, the upper frame portion 28 and the vertical frame portion 30 may be formed through a bending and/or stamping process while the lower frame portion 32 may be formed through a casting process. Casting is a manufacturing process in which a liquid material is usually poured into a mold, which contains a hollow cavity of the desired shape, and then allowed to solidify. Once solidified, the lower frame portion 32 is coupled to the vertical frame portion 30. However, it is contemplated that any known manufacturing process may be utilized to form any portion 28, 30, 32 of the frame 26.

In embodiments in which the lower frame portion 32 is casted, or formed by any other like process, the attachment and coupling receptacles 76, 104 may be integrally formed therein. As described above, the attachment and coupling receptacles 76, 104 may be hermetically sealed and prevent the fasteners 78, 102 from insertion through any portion 28, 30, 32 of the frame 26. Moreover, the lower frame portion 32, or any portion 28, 30, 32 of the frame 26 that is casted, may have a closed outer periphery 88. The closed outer periphery 88 may provide additional resistance against rotational forces 48, downward (linear) forces 46, and/or torsion 50 when the door 40 is coupled to the upper or lower hinges 42, 44. Moreover, in various embodiments in which the lower frame portion 32 is casted, the upper frame portion 28 may be formed from a first material while the lower frame portion 32 may be formed from a second material. The first and second materials may vary from one another.

Figure 15:
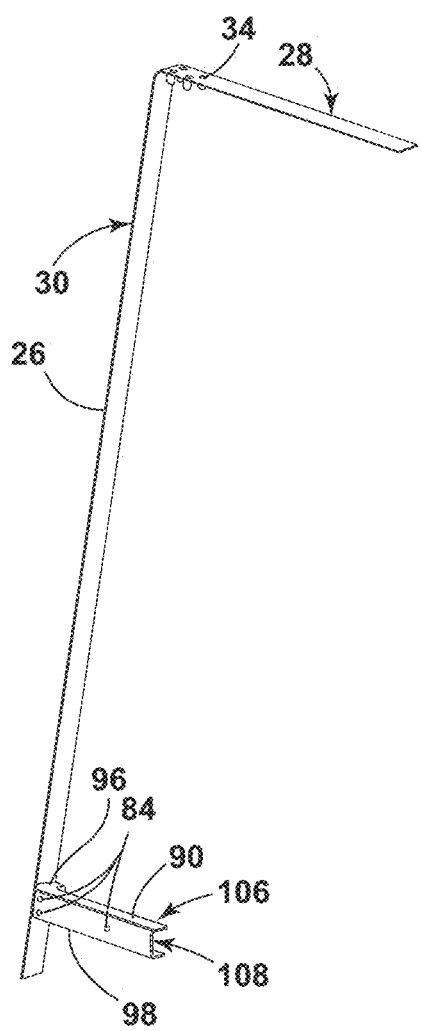
FIG. 15 is a front perspective view of the hinge support frame, according to an alternate embodiment.
Figure 16:
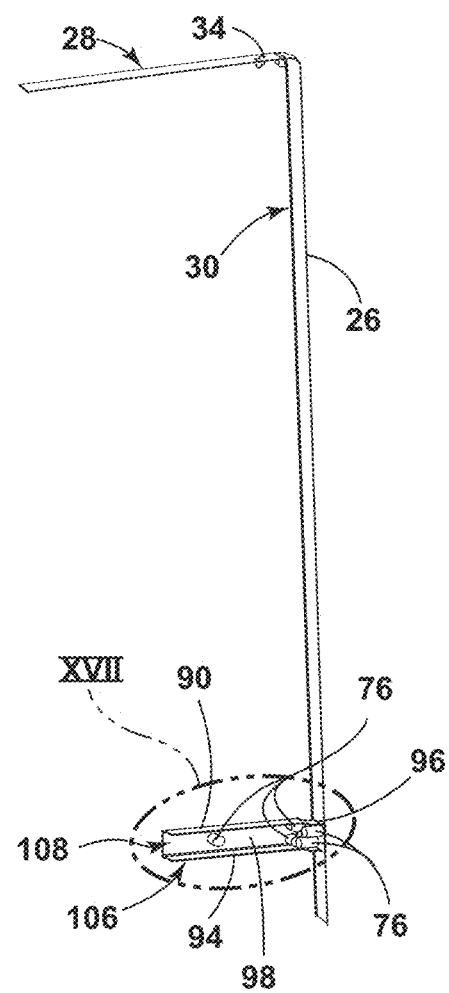
FIG. 16 is a rear perspective view of the hinge support frame, according to the embodiment of FIG. 15.
Figure 17:
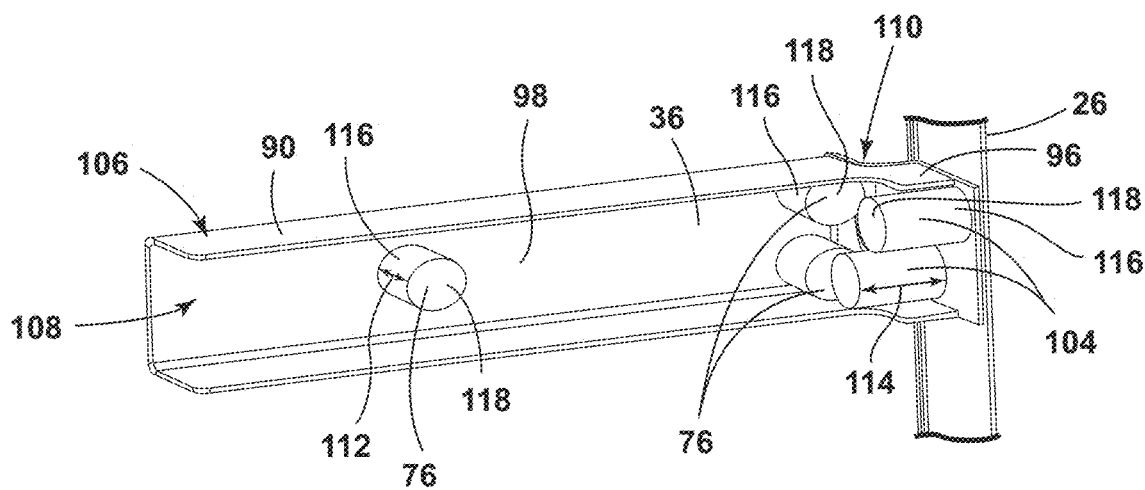
FIG. 17 is an enhanced rear perspective view of the area XVII of FIG. 16.

Referring to FIGS. 15-17, the lower frame portion 32, in various embodiments, may include an open periphery 106. For example, the lower frame portion 32 may have a similar structure to that described above, except that the top section 90 and the bottom section 94 may define a gap 108 therebetween.

The lower frame portion 32, according to various embodiments, may be formed through a cold-rolling process. In a cold-rolling process, rollers bend a metal sheet progressively and gradually into the final lower frame portion 32 shape with the specified bend radii, or bend angles. The metal sheet is loaded into an uncoiled machine and the metal sheet is fed through a roll former where it is bent into shape and sheared to the desired lengths. Further, a portion of the metal sheet that forms the lower frame portion 32 may be cut, punched, stamped, etc. then bent to form the inner section 96. The inner section 96 may be coupled to the top section 90 and/or bottom section 94 through any process known in the art. The inner section 96 may be separated from the front section 98 by a bent section 110.

As described above, the lower frame portion 32 may have increased strength once the top section 90, the bottom section 94, and/or the inner section 96 are formed and attached to one another, 90, 94, 96 and/or to the vertical frame portion 30. The inner section 96 may include one or more coupling receptacles 104 for operably coupling the lower frame portion 32 to the vertical frame portion 30. The coupling receptacles 104 may be hermetically sealed such that a vacuum and/or insulated structure 22 disposed between the wrapper 14 and the liner 16 (FIG. 3) may be maintained after the frame 26 has been formed and disposed within the insulating cavity 20.

As illustrated in FIG. 17, the attachment receptacles 76 may extend into the insulating cavity 20 in a first direction. The coupling receptacles 104 may extend into the insulating cavity 20 in a second direction. The first and second directions may be transverse to one another in various embodiments. In alternate embodiments, the attachment receptacles 76 and coupling receptacles 104 may be offset from one another 76, 104 in any other orientation. Alternatively still, the first and second directions may be parallel to one another.

Likewise, the one or more attachment receptacles 76 disposed on the upper frame portion 28 may extend in a third direction. The third direction may be orthogonal to the first and/or second directions. Alternatively, the third direction may be offset from the first and second directions by any angle. Alternatively still, the third direction may be parallel to the first and/or second directions.

Referring still to FIGS. 15-17, the attachment receptacles 76 may define a first height 112 while the coupling receptacles 104 may define a second height 114. In some embodiments, the first height 112 is less than the second height 114. In other embodiments, the first height 112 is greater than the second height 114. In various other embodiments, the first height 112 may be equal to the second height 114.

Referring to FIGS. 6-17, the attachment receptacles 76 and/or coupling receptacles 104 may be of a tubular geometry, or any other geometry. For example, in various embodiments, any of the attachment receptacles 76 and/or coupling receptacles 104 may have a cubical, spherical, rectangular, and/or any other shape without departing from the teachings provided herein.

With further reference to FIGS. 6-17, the attachment receptacles 76 and/or coupling receptacles 104 may include an extension surface 116 that extends (e.g., transversely) from the upper frame portion 28, the lower frame portion 32, and/or the vertical frame portion 30. The extension surface 116 may partially and/or fully encompass the fastener 78, 102 once the fastener 78 102 is disposed within the attachment receptacle 76 and/or coupling receptacle 104.

A terminal surface 118 may define the height 112, 114 of the attachment receptacles 76 and coupling receptacles 104, respectively. The terminal surfaces 118 may be planar and/or curved. Further, the terminal surfaces 118 may be transverse to the extension surface 116. Alternatively, in some embodiments, the intersection of the extension surface 116 to the terminal surface 118 may have a radius of any desired curvature. The attachment receptacles 76 and coupling receptacles 104 may be formed from any number of components that may be coupled to one another to form the hermetically sealed attachment receptacles 76 and coupling receptacles 104. Alternatively, the attachment receptacles 76 and/or coupling receptacles 104 may be integrally formed through any manufacturing process known in the art.

According to the various embodiments, the hinge support frame 26 described herein can be incorporated within various appliances 12 that can include, but are not limited to, refrigerating appliances, freezers, humidors, ovens, laundry appliances, water heaters, various other household appliances and fixtures and other similar household and commercial applications.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An appliance comprising:
    a cabinet having a wrapper, a liner, and a trim breaker, wherein the wrapper, the liner, and the trim breaker define an insulating cavity therebetween;
    an insulating material disposed within the insulating cavity;
    first and second doors rotationally mounted to the cabinet;
    first and second independent frames spaced apart and disposed within the insulating cavity, wherein the first and second independent frames correspond with the first and second doors, respectively, each frame of the first and second independent frames including:
        a vertical frame portion positioned parallel with a vertical edge of a respective door of the first and second doors;
        a generally planar upper frame portion extending perpendicularly from an upper end of the vertical frame portion and extending partially along a width of the respective door when the respective door is closed; and
        a lower frame portion extending perpendicularly from the vertical frame portion and extending partially along the width of the respective door when the respective door is closed, wherein the lower frame portion has a closed outer periphery;
    an upper hinge mount integrated within the upper frame portion; and
    a lower hinge mount integrated within the lower frame portion, wherein a hinge of the respective door is directly coupled with one of the upper hinge mount and the lower hinge mount, and further wherein the upper hinge mount and the lower hinge mount each include a hermetically sealed attachment receptacle extending in transverse directions.

2. The appliance of claim 1, wherein for each frame of the first and second independent frames, the upper frame portion, the vertical frame portion, and the lower frame portion are all formed from a single component.

3. The appliance of claim 1, wherein the upper hinge mount of each frame of the first and second independent frames is positioned proximate opposing left and right sidewalls, respectively, of the cabinet, and wherein the lower hinge mount of each frame of the first and second independent frames is positioned proximate the right and left sidewalls, respectively, and wherein the first and second doors define a pair of French doors.

4. The appliance of claim 3, wherein each frame of the first and second independent frames is positioned within the right and left sidewalls, respectively, so as to be fully received by the insulating cavity.

5. The appliance of claim 1, wherein the insulating material is configured as a vacuum insulated structure.

6. The appliance of claim 1, wherein the insulating cavity is a hermetically sealed cavity.

7. The appliance of claim 1, wherein the attachment receptacles each maintain a fastener therein that is separated from the insulating cavity by the attachment receptacles.

8. An appliance comprising:
    a cabinet defining an insulating cavity;
    a frame including a vertical frame portion positioned along an edge of the cabinet, an upper frame portion extending perpendicularly from a first end of the vertical frame portion, and a lower frame portion extending perpendicularly from a second end of the vertical frame portion, the second end opposite the first end, wherein the lower frame portion has a closed outer periphery;
    a first attachment receptacle disposed on the upper frame portion, the first attachment receptacle extending into the insulating cavity in a first direction;
    a second attachment receptacle disposed on the lower frame portion, the second attachment receptacle extending into the insulating cavity in a second direction, the second direction transverse to the first direction, wherein the first attachment receptacle and the second attachment receptacle are each sealed to be air non-permeable; and a door rotationally mounted to the cabinet via an upper hinge mounted to the upper frame portion and a lower hinge mounted to the lower frame portion, wherein a first fastener is vertically received by the first attachment receptacle and a second fastener is laterally received by the second attachment receptacle.

9. The appliance of claim 8, wherein a top section of the lower frame portion is coupled to an inner section of the lower frame portion to form the closed outer periphery.

10. The appliance of claim 8, wherein the first and second attachment receptacles at least partially define the insulating cavity.

11. The appliance of claim 8, wherein a wrapper defines first and second apertures that correspond to the first and second attachment receptacles, respectively.

12. The appliance of claim 8, wherein the frame is one of a pair of symmetrically positioned C-shaped frames.

13. The appliance of claim 8, wherein the upper frame portion is a first material and the lower frame portion is a second, different material.

14. The appliance of claim 8, wherein the lower frame portion is coupled to the vertical frame portion through one or more fasteners that are disposed within hermetically sealed coupling receptacles.

15. The appliance of claim 8, wherein engagement of the upper hinge with the upper frame portion maintains an at least partial vacuum within the insulating cavity.

16. An appliance comprising:
a cabinet defining an insulating cavity;
a frame disposed within the insulating cavity and including an upper frame portion extending along a top portion of the cabinet, a vertical frame portion extending downward from the upper frame portion and along a vertical wall of the cabinet, and a lower frame portion extending perpendicularly from the vertical frame portion, the lower frame portion having a closed outer periphery;
an upper hinge mount disposed on the upper frame portion, the upper hinge mount including a first attachment receptacle extending in a first direction;
a lower hinge mount disposed on the lower frame portion, the lower hinge mount including a second attachment receptacle extending in a second direction, the second direction transverse to the first direction, wherein the first and second attachment receptacles are sealed to be air non-permeable;
a first fastener vertically received by the first attachment receptacle and configured to couple an upper hinge to the upper hinge mount;
a second fastener laterally received by the second attachment receptacle and configured to couple a lower hinge to the lower hinge mount; and
a door rotationally mounted to the cabinet via the upper and lower hinges.

17. The appliance of claim 16, wherein the first hinge is a first type of hinge and the second hinge is a second type of hinge, wherein the first type of hinge is different than the second type of hinge.

18. The appliance of claim 16, wherein the insulating cavity is a hermetically sealed cavity.

19. The appliance of claim 16, wherein the first and second attachment receptacles each maintain the first and second fasteners separated from the insulating cavity.

20. The appliance of claim 16, wherein a wrapper defines a plurality of apertures that correspond to the first and second attachment receptacles on the frame.

* * * * *